US006933983B2

(12) United States Patent
Wredenhagen et al.

(10) Patent No.: US 6,933,983 B2
(45) Date of Patent: Aug. 23, 2005

(54) SYSTEM AND METHOD FOR REDUCING NOISE IN IMAGES

(75) Inventors: G. Finn Wredenhagen, Toronto (CA); Andrew Elias, Toronto (CA)

(73) Assignee: Jaldi Semiconductor Corp., Richmond Hill (CA)

(*) Notice: Subject to any disclaimer, the term of this patent is extended or adjusted under 35 U.S.C. 154(b) by 582 days.

(21) Appl. No.: 10/155,013

(22) Filed: May 28, 2002

(65) Prior Publication Data

US 2003/0095206 A1 May 22, 2003

Related U.S. Application Data

(63) Continuation-in-part of application No. 09/948,721, filed on Sep. 10, 2001, now Pat. No. 6,757,022.

(51) Int. Cl.[7] .......................... H04N 5/21; H04N 5/213

(52) U.S. Cl. ...................... 348/618; 348/607; 382/261; 382/275

(58) Field of Search ................................ 348/607, 618, 348/625, 627, 619, 620; 382/261, 266, 268, 269, 275; H04N 5/21, 5/213

(56) References Cited

U.S. PATENT DOCUMENTS 5,168,531 A * 12/1992 Sigel .......................... 382/291
5,475,438 A 12/1995 Bretl
5,625,421 A 4/1997 Faroudja et al.
5,732,159 A * 3/1998 Jung .......................... 382/262
5,793,435 A 8/1998 Ward et al.
5,929,918 A 7/1999 Marques Pereira et al.
5,943,099 A 8/1999 Kim
6,016,164 A 1/2000 Kawaguchi et al.
6,118,488 A 9/2000 Huang
6,118,489 A 9/2000 Han et al.
6,141,056 A 10/2000 Westerman
6,151,363 A 11/2000 Burl et al.
6,201,577 B1 3/2001 Swartz
6,298,161 B1 * 10/2001 Koo et al. .................. 382/233
6,618,439 B1 * 9/2003 Kuo et al. ............. 375/240.16

FOREIGN PATENT DOCUMENTS

WO 95/24785 8/1997
WO 01/72032 9/2001
WO 01/74056 10/2001

* cited by examiner

*Primary Examiner*—Michael H. Lee
(74) *Attorney, Agent, or Firm*—Marger Johnson & McCollom, P.C.

(57) ABSTRACT

A method is provided for selecting a filter for interpolating a target pixel for reducing noise in an image. The method comprises the following steps. A plurality of pixels along a predetermined contour is compared with a plurality of predefined patterns. The patterns represent visually significant patterns possible along said contour. A filter is selected from a predefined set of filters in accordance with the results of the comparison.

4 Claims, 6 Drawing Sheets

300

400

SYSTEM AND METHOD FOR REDUCING NOISE IN IMAGES

The present invention relates to a system and method for noise reduction in images, particularly to noise reduction in a video format conversion system. The application is a continuation-in-part of U.S. Ser. No. 09/948,721 filed Sep. 10, 2001 now U.S. Pat. No. 6,757,022, titled "A Method and Apparatus for Motion Adaptive Deinterlacing", which is hereby incorporated by reference.

BACKGROUND OF THE INVENTION

Noise can be introduced to an image in many ways, such as during image transmission through a non-ideal channel, during image decoding, and during image encoding. The following are some examples of image noise that can occur. "Buttey" and "mosquito" noise are types of noise that result from Moving Picrare Experts Group (MPEG) compression. Using a limited bit precision during quantization in Wavelet compression, tiles, or macro-blocks in the case of MPEG, can become visible, lending a patchy appearance to the source image during decompression. Film grain noise is caused by the development process of silver chemical based film where emulsions aggregate into crystals causing what is commonly referred to as "salt and pepper" noise. Some film developers exploit his chemical process for a visual art-house effect.

Whatever the source of image noise, it typically has a usually displeasing effect on image quality. Even if the effect of noise such as film grain noise is desired, certain image processing tasks, such as format conversion, can render a tolerable level of visual noise in the image intolerable. For example, during format conversion it is often necessary to scale an incoming image, either to decrease or increase its size. The latter process can exacerbate the effect of noise. Filters that sharpen images are required to preserve detail such as edges and lines. However, such filters rend to worsen the visual noise in the image. It is desirable to be able to retain, and even enhance the detail in the image and, at the same time, suppress the noise. Traditional image processing techniques that rely on a non-adaptive, linear scheme are not able to overcome the image sharpening/noise reduction dichotomy, as they are conflicting requirements.

There are currently many methods for noise estimation and reduction. For example, in WO 95/24785 a noise floor is estimated using a sum of absolute differences. In WO 01/72032 A1 and WO 01/74056 a one N-dimensional transmission function is used to either pass through more or less of the pixel avoiding the need for multiple filters. Median filters are often cited as having good noise behaviour, especially edge enhancement. However, these filters typically do nor deal with correlated pixel detection and consequently they may make the wrong decision.

In "Space Scale Analysis for Image Sampling and Interpolation", by G. E. Ford, R. R. Estes and H. Chew a method based on Anisotropic Diffusion is discussed. This method works by modulating the frequency response of a three-tap filter in either the horizontal direction or the vertical direction. The frequency response of the filter is a function of the step size of the centre pixel. It has drawbacks, as this method does not properly account for noise. The decision window is too small and the filter lengths are too short to obtain the required range of frequency responses needed for a high quality image interpolation of filtering. Further, there is a lack of information in the diagonal directions, and no steps are taken to distinguish between image detail and noise.

Other noise reduction algorithms are based on equalization techniques. Such techniques separate the frequency bands into many strata of image content frequency ranging from low to high. Wavelets, for example, have been used to decompose an image in this way. Noise reduction is then applied to the higher frequency layer, sometimes in the form of smoothing content of the high frequency layer. Recombining the layers results in an image that has less visible noise. However, there are at least two drawbacks to this approach. First, equalization usually requires separating data into different frequency bands, which is computationally expensive. Second, smoothing the high frequency layers not only reduces noise, but also details. For example, edges that are parts of fine detail such as a strand of hair can easily be interpreted as noise.

Thus, there is a need for a computationally inexpensive system and method for effectively reducing the noise in an image. It is an object of the present invention to obviate or mitigate at least some of the above mentioned disadvantages.

SUMMARY OF THE INVENTION

In accordance with an aspect of the present invention, there is provided a system and method for estimating and reducing the noise in an image scene during formats conversion. A non-parametric model of noise is based on what is generally perceived as visually objectionable noise. Image scene statistics are fed into an adaptive filter, which selects amongst different filters to reduce noise in the image scene while maintaining edges and fine detail.

There is provided a method for selecting a filter for interpolating a target pixel for reducing noise in an image. The method comprises the following steps. A plurality of pixels along a predetermined contour is compared with a plurality of predefined patterns. The patterns represent visually significant patterns possible along said contour. A filter is selected from a predefined set of filters in accordance with the results of the comparison.

BRIEF DESCRIPTION OF THE DRAWINGS

An embodiment of the invention will now be described by way of example only with reference to the following drawings in which.

DETAILED DESCRIPTION OF THE PREFERRED EMBODIMENT

Figure 1:
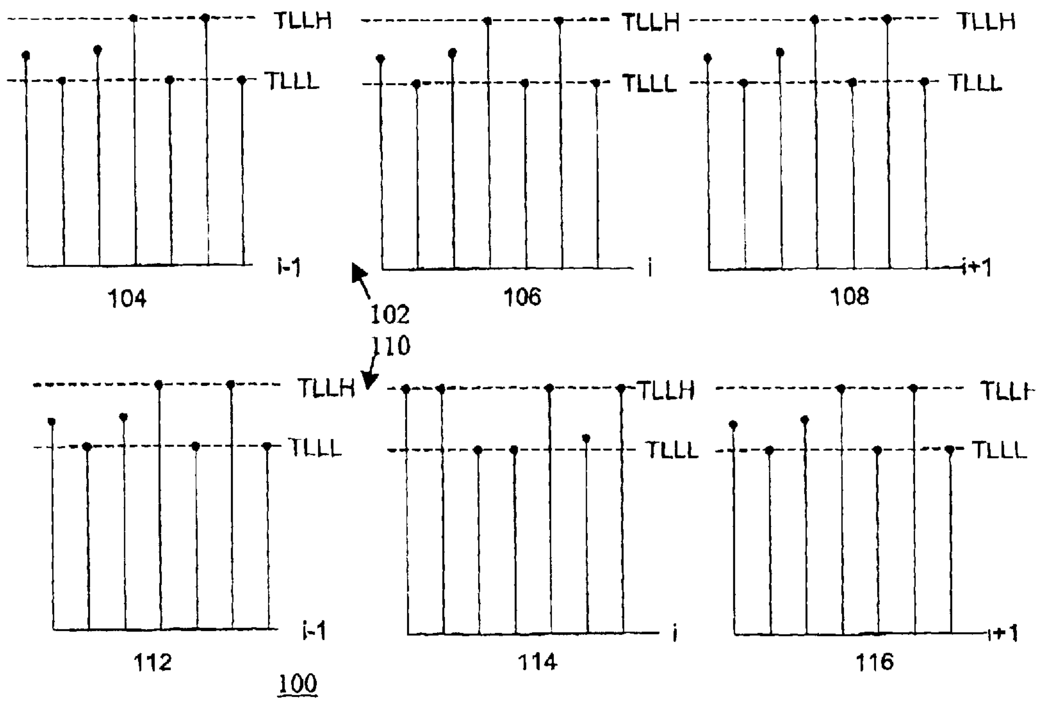
FIG. 1 is a series of graphs illustrating one-dimensional pixel streams and associated thresholds.

For convenience, like numerals in the description refer to like structures in the drawings. This description addresses, in more detail, noise reduction described in its parent application titled "A Method and Apparatus for Motion Adaptive Deinterlacing". Therein, a method is described for performing notion adaptive deinterlacing. A motion adaptive vertical temporal (MAVT) filter achieves variability in behaviour by adjusting filter coefficient weights in an adaptive manner depending on a number of conditions. The method works in accordance with the following equation.

$$MAVTF((\phi,m,s,n,t)=W((\phi,m,s,n,t)*CFF(\phi,m,s,n,t)+(1-W(\phi m,s,n,t))*PFF(\phi,m,s,n,t)$$

MAVTF((ϕ,m,s,n,t) is the motion-adaptive vertical-temporal filter used to compute an interpolated target pixel. It comprises a number of sub-components including a current field filter CFF(ϕ,m,s,n,t), a previous field filter PFF((ϕ, m,s,n,t), and a weighting function W(ϕ,m,s,n,t). The variables for these functions include a phase ϕ that corresponds to a discrete polyphase filter implementation, wherein the phase is usually defined to reside in the interval [0,1]. Inter-pixel distance is taken as unity and the phase ϕ measures the distance of a target pixel from an appropriate source pixel. The details associated with the estimation of the arguments ϕ, m, and s are described in the parent application. In the present description, the estimation of noise n is described in detail.

The noise n is determined by examining image content and differentiating between structures, such as lines and edges, pixels that are correlated with their immediate neighbours, and those that are not. This information is used in conjunction with the intensity of the pixels in a given region, aggregated noise statistics compiled over several fields of image data, as well as various thresholds and user-defined settings.

Generally, surface characteristics of an image are examined and a filter is selected from a set of filters, each having different frequency responses. This provides the ability to alter input data to achieve a desired output response. For example, if low amplitude inter-pixel differences are present in the image, a "soft" filter is applied because the inter-pixel difference could be due to noise. Using a "sharp" filter has a frequency response with less attenuation in higher frequency than a soft filter. Thus, a sharp a filter is used to retain edge information and can exaggerate inter-pixel differences.

Further, the magnitudes of the pixel values are also considered, because the magnitudes play a key role in the directional nature of the image surface in a neighbourhood about the target point. Conceptually, it is useful to think of this approach as one that modulates the frequency response of the filter with the "roughness" of the local surface properties. A soft filter is referred to as "stiff", because, in effect, it reduces the high frequency content in the image, dampening curvature. A "flexible" filter is one that is sharp, because it has the ability to replicate, or follow, and even accentuate, the curvature for a given image surface content. Generally, it is desirable to match, in some way, the so-called "roughness" of the filter with the "roughness" of the surface content of the image.

Figure 6:
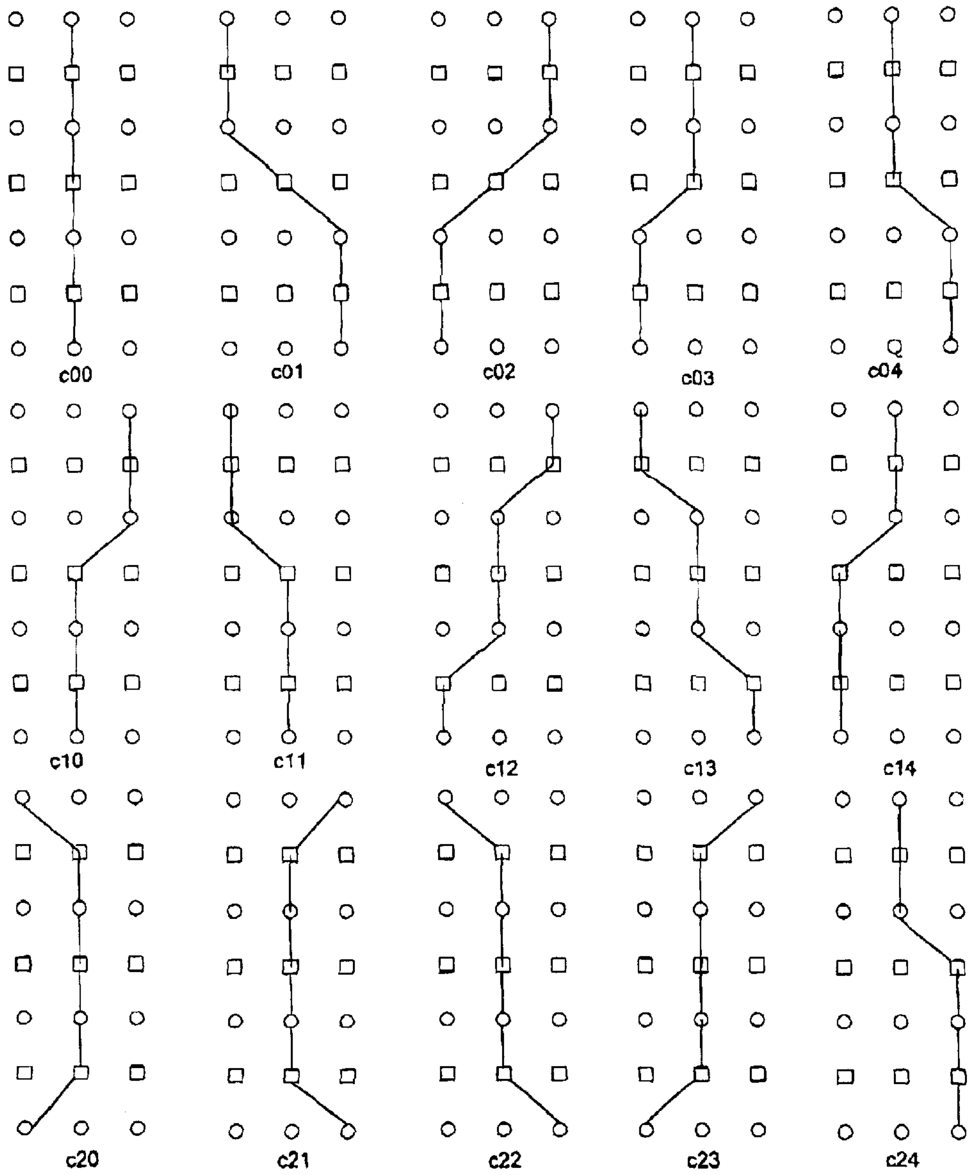
FIG. 6 is diagram illustrating a plurality of contour configurations in a 7-by-3 pixel window.
Figure 7:
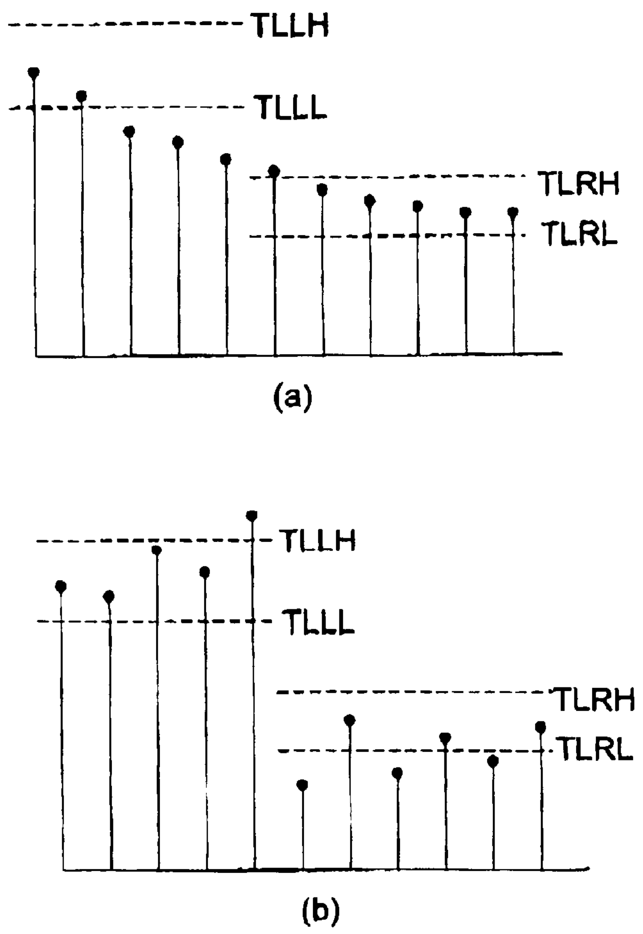
FIG. 7*a* is a graph illustrating a step response during convolution with a soft filter.
FIG. 7*b* is a graph illustrating a step response during convolution with a sharp filter.

Yet further, as described in the parent application filter tap selection is not limited to vertically or horizontally linear options. Contouring allows pixels in a neighbourhood of the target pixel to be selected for the filter taps such that the filter tap configuration is non-linear. Referring to FIG. 6, sample contour configurations are illustrated generally by numeral 600. The general concept behind selecting a filter is to select a configuration that minimizes the intensity difference between pixels. Once the pixel taps are chosen, the most appropriate filter is selected based on its frequency response. The selection of the filter is based partly on the noise in the image. The determination of the noise n can be encapsulated in an equation as follows.

$$\text{PixelOutput}=n(IC(i,j,t),TC(i,j,t),KC(i,j,t),HC(t),NCTC(t),FT(k),t)$$

PixelOutput is the interpolated pixel. An adaptive noise processor (n) has input arguments IC(i, j, t), TC (i, j, t), KC (i, j, t), HC(t), NCTC(t) and FT(k) which represent an image surface map, user-defined programmable thresholds, contour selection, a noise histogram, a noise classification template, and the available filter types respectively at the ith row of the jth column of channel C at time t. The image surface map represents a portion of the image surface in a rectangular window. The user-defined thresholds determine the precise behaviour of the algorithms. For instance, a large noise threshold means that less content in the image surface map will be considered as noise. Each of the arguments is a complicated function in its own right. It is preferable that the ordering to the sequence of decisions is maintained so that the noise reduction algorithm works more effectively. For example, it is preferable that the most appropriate contour be selected before determining the degree of surface roughness.

The current embodiment describes an algorithm for adaptive noise reduction and sharpening based on adaptive filtering using a non-parametric model. The non-parametric model of noise reduction does not assume noise is additives multiplicative or that its statistics behave in accordance with any distribution. Noise reduction is applied by adaptive filtering using rules derived from a psycho-visual understanding of what is perceived as visually objectionable noise in an image scene. The algorithm examines image content in a neighbourhood about a target pixel and, based on local statistics and surface characteristics, selects a most appropriate discrete-time polyphase finite impulse response (FIR) filter to directionally interpolate, or filter, the target pixel.

Local statistics are aggregated over a period of time and several image scenes to guide the overall behaviour of the algorithm. The algorithm uses correlation-based statistics to mark the presence of fine structured detail in the local neighbourhood. Fine detail can be easily mistaken for noise, which can then attenuated by traditional noise processing to such an extent that the detail is effectively lost. Hair, for example, is an example of a fine detailed structural element within an image scene. Depending on the orientation of a strand of hair relative to the direction of interpolation, the strand of hair can appear to be noise. That is, only one pixel in the direction of interpolation stands out when compared to neighbouring pixels as determined by a set of thresholds. However, pixels that form the strand of hair in the image scene are correlated along a direction of the hair strand. This signifies that the pixel elements (pels) that compose the hair strand are not likely to be noise. Thus, the algorithm looks for the presence of correlated pels to avoid misinterpreting them for noise.

Referring to FIG. 1, an example as to how the context of a pixel can be important to determining noise is illustrated generally by numeral 100. FIG. 1 comprises two sets of three line graphs. Each of the graphs illustrated in FIG. 1 represents the intensities of seven adjacent pixels. The intensities are represented by the relative heights of the lines. In the first set 102 a first line graph 104 represents pixel intensities on the i−1th line, a second line graph 106 represents pixels intensities on the ith line, and a third line graph represents pixels intensities on the i+1th line. Similarly, in the second set 110 a first line graph 112 represents pixel intensities on the i−1th line, a second line graph 114 represents pixels intensities on the ith line, and a third line graph 116 represents pixels intensities on the i+1th line.

Trend lines Trend Line Left High (TLLH) and Trend Line Left Low (TLLL) are close together, for example TLLH=10 and TLLL=15. That is, all seven pixel values fall between TLLH and TLLL and thus have a difference no greater than 5. Furthermore, it is assumed in this example that a difference of 5 is small based on an 8-bit scale. If a decision for noise is based on the image surface of the second graph 104 in the first set 102 alone, it may be assumed that there is no significant information present and the slight differences in amplitude are attributed to noise. However, if all three graphs in the first set are examined, it can be seen that there is a correlation among the pixels in the two dimensional neighbourhood. Despite the fact that their differences are small, they are significant because generally, noise is not spatially correlated. Therefore, in this case, it is preferred that pixels are preserved to retain what is most likely fine image detail and not noise.

In contrast, referring to the second set of graphs, it can be seen that there is not a recognizable two-dimensional correlation between all three graphs. In this case, it is more likely that the pixel differences are noise. Therefore, in this case, it is preferable to reduce the difference between pixel magnitudes in this region. Hence, there is value in doing a two-dimensional analysis before performing noise reduction.

The challenge in noise reduction algorithms used in image processing is that guesswork is required for determining what is and is not noise. Sometimes, a clear distinction cannot be made, even when a human viewer examines the image. Therefore, noise reduction algorithms usually contain a heuristic element. As a result, rules are used in the decision logic. These rules are flexible in that they operate using programmable thresholds, which can be altered dynamically depending on the estimated level of noise. Consequently, the noise algorithm operates in two steps. First, the noise is estimated and then the noise is acted upon by image processing. Upon start-up, the algorithm is set to default values that have been determined from experimental evidence. The estimation process can be turned on or off and is under direct control of a user, as are all other aspects of the algorithm.

The first step of the algorithm, the estimation of noise, allows the algorithm to adapt to statistics in the image scene, or a series of successive image scenes in the case of video. Thus, the algorithm minimises displeasing visual noise from the processed image for a much wider range of noise energies and noise types than standard noise reduction algorithms. In order to achieve this goal, an estimate of the noise is determined as follows.

Figure 3:
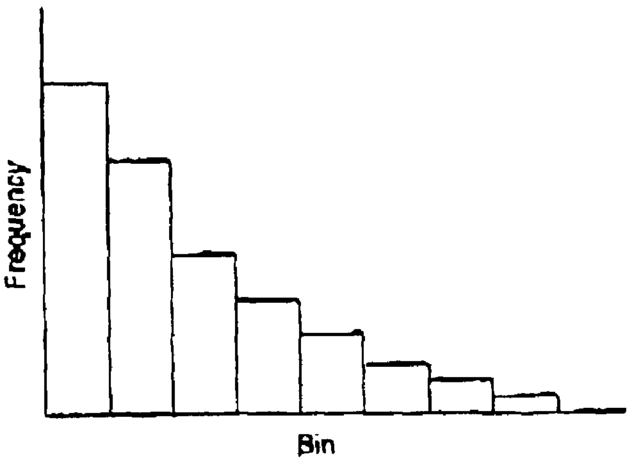
FIG. 3 is a graph illustrating a histogram comprising a typical noise distribution pattern.

Noise is estimated by compiling a histogram. The histogram comprises a plurality of bins. In the present embodiment, eight bins are used but the number is generally programmable. Each bin represents an amplitude value ranging from a lower threshold to an upper threshold. The number of occurrences per bin is the number of occurrences of a predefined event that occur between the lower and upper threshold of that bin. Thus, on a Cartesian graph the ordinate indicates the number of properly normalized occurrences and the abscissa indicates the bin. In the present embodiment, the predefined event is a determination of noise. Referring to FIG. 3, a typically expected noise histogram is illustrated generally by numeral 300. In a typical noise scenario, the number of noise instances falls off as the noise amplitude increases. Generally, an underlying assumption is that noise in an image is not both massive and frequent.

The histogram is generated as follows. A register is used to keep track of the number of instances of noise for each bin. When a bin is updated, its associated register value is incremented by one. Furthermore, the bins do not need to have an equal width. For example, it is advantageous to have a more coarse classification for higher noise amplitudes and a finer resolution at the lower noise levels, since typically that is where most of the noise will occur. Programmable thresholds are provided for determining the exact partitioning of each bin.

Figure 2:
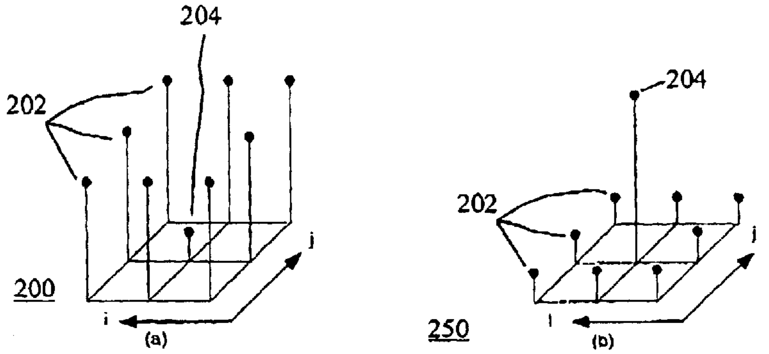
FIG. 2*a* is a three dimensional graph illustrating a noise classification template wherein the noise has a greater magnitude than surrounding pixels.
FIG. 2*b* is a three dimensional graph illustrating a noise classification template wherein the noise has a lesser magnitude than surrounding pixels.

For the ease of explanation, an example is provided whereby noise is deemed present whenever a centre pixel in a neighbourhood of pixels is sufficiently different from its neighbours. The difference between the centre pixel and surrounding pixels is compared against a threshold, regardless of the magnitude of pixels in question, provided the surrounding pixels are of similar magnitude. For example, referring to a FIG. 2*a*, a 3-by-3 pixel neighbourhood is illustrated generally by numeral 200. Each of the surrounding pixels 202 are similar in magnitude, while the centre pixel 204 has a significantly lesser magnitude. Similarly, referring to FIG. 2*b*, a 3-by-3 pixel neighbourhood is illustrated generally by numeral 250. Each of the surrounding pixels 252 are similar in magnitude, while the centre pixel 254 has a significantly greater magnitude. In each of the above cases, the difference in magnitude between the centre pixel and its surrounding pixels is assumed to be a result of noise. Each time such a pattern is encountered, it is deemed noise.

Once the noise its detected, it is classified by its magnitude relative to the surrounding pixel magnitudes. For example, a first occurrence of noise has a magnitude difference of 5 from the surrounding pixels and a second occurrence of noise has a magnitude difference of 15 from the surrounding pixels. Each occurrence is recorded by incrementing the count of an associated bin. That is, assume that a first bin has a lower threshold of 3 and an upper threshold of 10, and a second bin has a lower threshold of 11 and an upper threshold of 18. The first occurrence of noise increments the count of the first bin and the second occurrence increments the count of the second bin. Typically, there are more than two bins, the thresholds of which are programmable as previously described. Thus, greater resolution is added to the classification of threshold values for building a histogram representing a noise energy distribution profile for an image scene.

The pattern described above is a basic noise classifier template. However, the definition of noise can be extended to include other patterns, as will be appreciated by a person skilled in the art. Noise detected using different noise patterns is combined using a weighted sum of the magnitude differences for providing an aggregate histogram that reflects all different types of noise that is deemed important to measure. Alternately, it is possible to maintain separate histograms for each noise pattern, but requires more memory.

Figure 4:
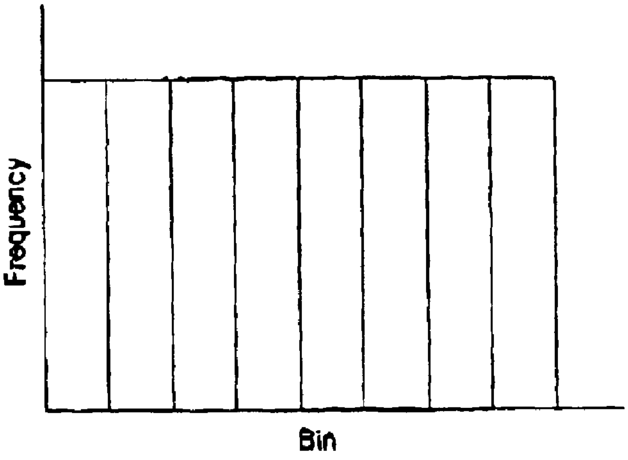
FIG. 4 is a graph illustrating a histogram comprising a uniform noise distribution pattern.
Figure 5:
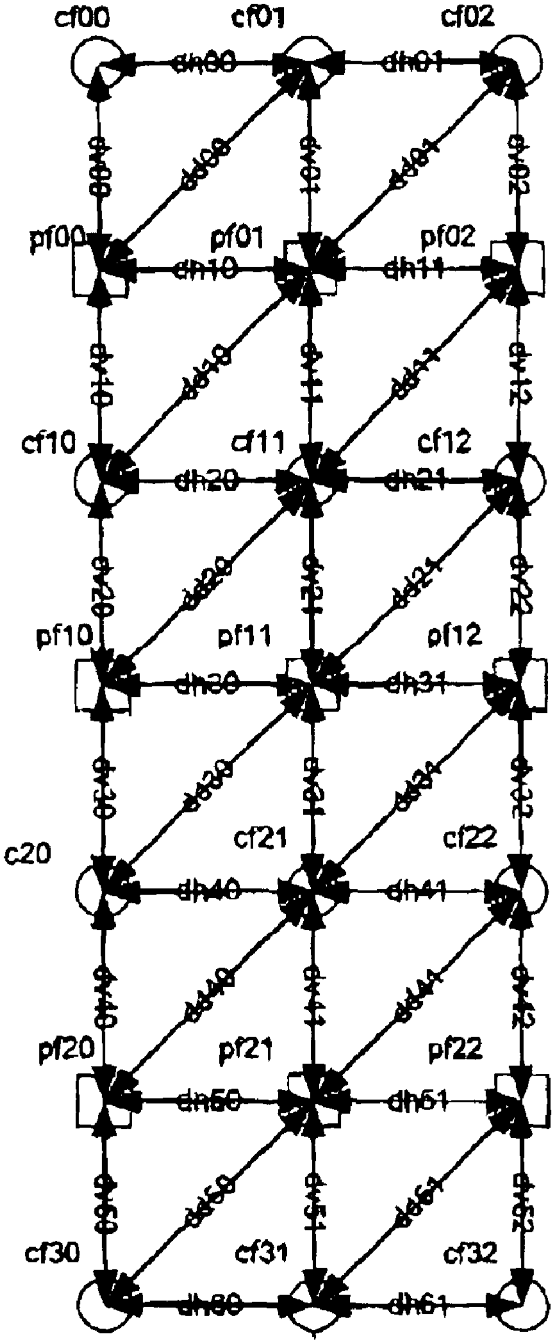
FIG. 5 is diagram illustrating a three-by-seven pixel window with associated inter-pixel differences.

Once the histogram has been established, it is quantified. A histogram for channel C at time t is referred to as HC(n, t), where n=0, . . . , N-1. The histogram has N bins and the bins have boundaries defined by threshold values T(n). function scalar A(n) is defined as a measure of the noise histogram, where A(n)=n* such that n* is a minimum value of n such that the sum for i equal 0 to n of RC(n, t) is greater than a predefined positive number r.A The quantity A(n) is associated with an area under HC(n, t). That is, the larger n must become to meet or exceed r, the less noise there is accumulated in the lower bins of the histogram. Referring once again to FIG. 3*a*, a typical noise distribution is illustrated generally by numeral 300. As illustrated, the majority of the noise is in the lower bins, meaning that most of the noise is low amplitude noise. Referring to FIG. 4, a uniform noise distribution is illustrated generally by numeral 400. In this example, the noise is uniformly distributed meaning that there is roughly an equivalent amount of noise across a broad spectrum of amplitudes. Thus, by examining the shape of the noise histogram profile, it is possible to determine where the noise energy is concentrated. Assuming that there are approximately the same number of noise occurrences overall for both examples and a constant value for the positive number r, the corresponding value for A(n) is larger for the uniform distribution example than the typical distribution example. Visually, this corresponds to more significant noise for the uniform distribution example than the typical distribution example. Accordingly, the noise reduction algorithm implemented will be more aggressive in attempting to reduce noise for the uniform distribution example. Typically, the larger the value for A(n), the more visually significant the noise. That is, it will be more inclusive as far as what is noise is concerned.

Therefore, the selection of the three-filter set and their thresholds is made in accordance with the amount of noise detected in an image. For example, if it is determined that the overall image is noisy, one or more filters in the three filter set may be set to aggressively attenuate noise. Thus, it is possible, although unlikely, that even the “sharp” filter of the filter set is relatively “soft”. Conversely, if it is determined that the overall image in relatively noise-free, a three filter set is selected such that sharpens the image more than had noise been present. Thus, even the “soft” filter of the filter set can be relatively sharp. For small deviations in the value of A(n) it is possible to use the same filter set, but alter the parameters of the filters to sharpen or soften them.

Even though noise is defined above in a specific manner, occurrences that are deemed noise are not necessarily eliminated. They may well be noise-free parts of the image. They do, however, serve to raise suspicion and are fed forward to the second portion of the noise reduction algorithm. This information is used in conjunction with additional information, described as follows, for filtering the target pixel.

Scene change information is also useful to assist validating the effectiveness and accuracy of the noise estimation process. The noise estimation process uses a noise classification template. If, for example, a scene change is encountered and the noise statistics vary dramatically across the scene change boundary, the noise would appear to be strongly correlated with the image content. While this is certainly possible, it is not preferable. Thus, checking the noise statistics across a scene change provides a gauge for assisting to determine the correctness of the noise classification template in use. If the noise statistics do vary dramatically across a scene change, it is preferable to be able to alter the strategy for defining noise. In the preferred embodiment, the weighting factors applied to the various noise classification templates are modified for achieving stability in the noise histogram.

Figure 9A:
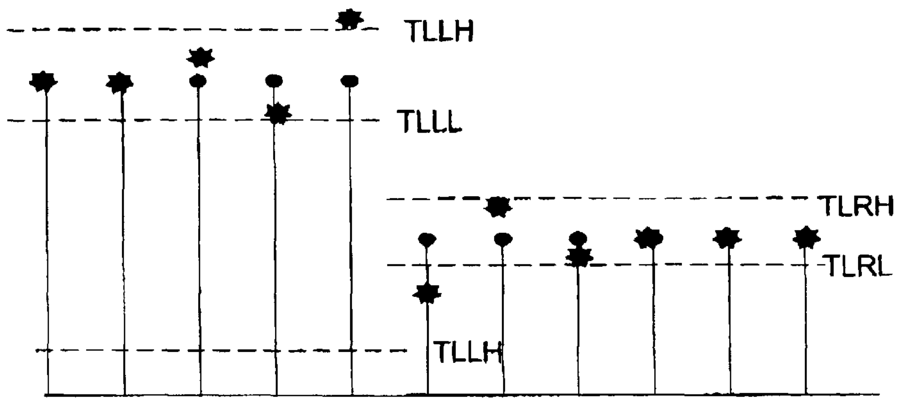
FIG. 9 is a graph of Left-High, Left-Low, Right-High and Right-Low trend lines illustrating overshoot control.
Figure 9B:
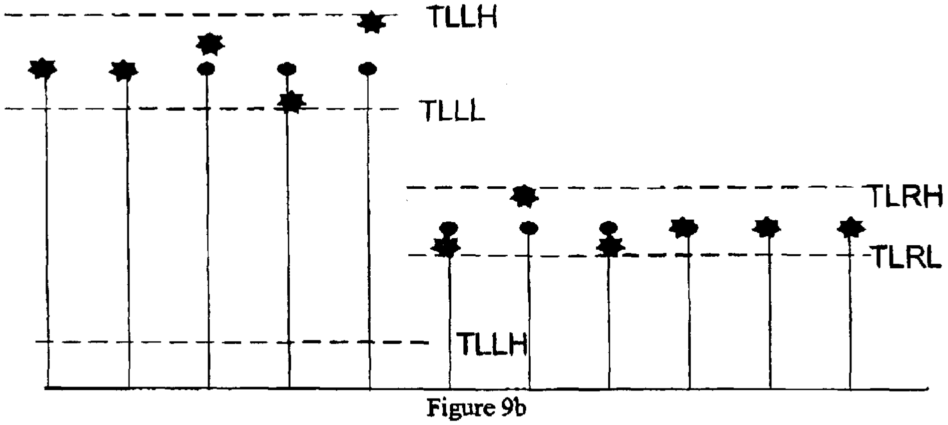

FIG. 9 shows trend lines that limit the overshoot or undershoot of the filter response. If the FIR filter is under-damped, ringing will occur. Ringing (Gibb’s phenomenon) results in a visual echo of edges. Severe ringing can degrade the quality of an image. Yet, sharp edges are sometimes preferred to soft ones. In order to achieve both requirements, that is a sharp edge with no or little ringing, the trend line approach is adopted. The typical response without trend-lines for an under-damped filter is shown in FIG. 9*a* and the inclusion of the trend lines and trend line logic is shown in FIG. 9*b*. The stars in the diagrams represent the filtered pixels values with and without the trend lines. For example, FIG. 9*a* shows where the filtered values would have fallen had no trend line boundary been used. Note that some of the pixels fall outside of the trend line boundaries. In FIG. 9*b*, the trend lines are enforced, and the pixels are limited to reside within the trend lines, The present embodiment selects from three on-chip filters whose frequency response corresponds to “super soft”, “soft” and “nominal”. The names have been selected mainly to indicate the relative cut-off frequency of their associated filters. Thus, for example, it is possible for the designated “super soft” filter to sharpen detail. The salient point is that it is preferred that there are at least three levels of noise reduction on chip at any instant in time. The filters are easily interchanged and can be replaced by a set of new filters. A microprocessor can be used for this purpose. The microprocessor houses an abundance of filter sets. Which set is active within the chip depends on the level of noise, the state of the automatic noise reduction algorithms, and user input.

The filter selection comprises three steps. First, numerical calculations are performed for determining a number of predefined conditions in the image. Second, a structure determination is performed for attempting to differentiate noise from structural patterns. Third, the filter is selected from a plurality of filters in accordance with all of the associated selection criteria. These steps are described in detail as follows.

In the present embodiment, a number of conditions are predefined for simplifying calculations and quantifying various aspects of the image. These conditions include the following. Four super soft conditions, four soft conditions and four level conditions are calculated between adjacent pixels. These conditions are defined by the equations in Table 1.

TABLE I

| | |
|---|---|
| ΔSSOFT_COND_1 | abs(CF_Y(0) − CF_Y(1)) < THRESHOLD_SSOFT |
| ΔSSOFT_COND_2 | abs(CF_Y(0) − CF_Y(2)) < THRESHOLD_SSOFT |
| ΔSSOFT_CONT_3 | abs(CF_Y(0) − CF_Y(3)) < THRESHOLD_SSOFT |
| ΔSSOFT_COND_4 | abs(CF_Y(0) − CF_Y(4)) < THRESHOLD_SSOFT |
| ΔSOFT_COND_1 | abs(CF_Y(0) − CF_Y(1)) < THRESHOLD_SOFT |
| ΔSOFT_COND_2 | abs(CF_Y(0) − CF_Y(2)) < THRESHOLD_SOFT |
| ΔSOFT_COND_3 | abs(CF_Y(0) − CF_Y(3)) < THRESHOLD_SOFT |
| ΔSOFT_COND_4 | abs(CF_Y(0) − CF_Y(4)) < THRESHOLD_SOFT |
| LEVEL_01 | abs(CF_Y(0) − CF Y(1)) < THRESHOLD_LEVEL |
| LEVEL_12 | abs(CF_Y(1) − CF Y(2)) < THRESHOLD_LEVEL |
| LEVEL_23 | abs(CF_Y(2) − CF Y(3)) < THRESHOLD_LEVEL |
| LEVEL_34 | abs(CF_Y(3) − CF Y(4)) < THRESHOLD_LEVEL |

In Table 1, CF_Y(X) represents the Xth current field pixel in the pixel window, and THRESHOLD_SSOFT, THRESHOLD_SOFT, and THRESHOLD_LEVEL represent the super soft, soft, and level thresholds respectively. While values for the thresholds are programmable, their default values are 3, 10, and 1 respectively. The variables in Table 1 are Boolean. A further two Boolean variables are determined by combining all of the super soft and soft variables respectively. These variables are listed in Table 2 below.

TABLE 2

| | |
|---|---|
| SP__SSOFT | ΔSSOFT__COND__1 && ΔSSOFT__COND__2 && ΔSSOFT__COND__3 && ΔSSOFT__COND 4 |
| SP__SOFT | ΔSOFT__CONT)__1 && ΔSOFT__COND__2 && ΔSOFT__COND__3 && ΔSOFT__COND 4 |

Further conditions examine the direction of pixel differences. Table 3 includes variables for determining whether pixel intensity increases or decreases between pixels. This is useful because recognisable patterns in an image can arise from examining the pattern of intensity increments and decrements. The variables in Table 3 are Boolean.

TABLE 3

| | |
|---|---|
| UP__01 | CF__Y(0) < CF__Y(1) |
| UP__12 | CF__Y(1) < CF__Y(2) |
| UP__23 | CF__Y(2) < CF__Y(3) |
| UP__34 | CF__Y(3) < CF__Y(4) |
| DOWN__01 | CF__Y(0) > CF__Y(1) |
| DOWN__12 | CF__Y(1) > CF__Y(2) |
| DOWN__23 | CF__Y(2) > CF__Y(3) |
| DOWN__34 | CF__Y(3) > CF__Y(4) |

The next step is a structural determination. During this step, a plurality of predefined patterns comprising various combinations of the above-described conditions is compared with the pixel information for determining if a pattern exists. Generally, the patterns indicate a potentially fine structure rather than noise, Table 4 below illustrates 42 possible patterns for a pixel window having five vertical pixels.

TABLE 4

| |
|---|
| SP__DETAIL__VERTICAL__1=(UP__01 && DOWN__12 && UP__23 && DOWN__34) |
| SP__DETAIL__VERTICAL__2=(DOWN__01 && UP__12 && DOWN__23 && UP__34) |
| SP__DETAIL__VERTICAL__3=(UP__01 && UP__12 && DOWN__23 && DOWN__34) |
| SP__DETAIL__VERTICAL__4=(DOWN__01 && DOWN__12 && UP__23 && UP__34) |
| SP__DETAIL__VERTICAL__5=(UP__01 && UP__12 && UP__23 && UP__34) |
| SP__DETAIL__VERTICAL__6=(DOWN__01 && DOWN__12 && DOWN__23 && DOWN__34) |
| SP__DETAIL__VERTICAL__7=(DOWN__01 && UP__12 && UP__23 && DOWN__34) |
| SP__DETAIL__VERTICAL__8=(UP__01 && DOWN__12 && DOWN__23 && UP__34) |
| SP__DETAIL__VERTICAL__9=(UP__01 && DOWN__12 && DOWN__23 && DOWN__34) |
| SP__DETAIL__VERTICAL__10=(DOWN__01 && UP__12 && UP__23 && UP__34) |
| SP__DETAIL__VERTICAL__11=(UP__01 && UP__12 && UP__23 && DOWN__34) |
| SP__DETAIL__12=(DOWN__01 && DOWN__12 && DOWN__23 && UP__34) |
| SP__DETAIL__VERTICAL__13=(DOWN__01 && DOWN__12 && LEVEL__23 && DOWN__34) |
| SP__DETAIL__VERTICAL__14=(UP__01 && LEVEL__12 && UP__23 && UP__34) |
| SP__DETAIL__VERTICAL__15=(DOWN__01 && UP__12 && b__DOWN__23 && LEVEL__34) |
| SP__DETAIL__VERTICAL__16=(LEVEL__01 && UP__12 && DOWN__23 && UP__34) |
| SP__DETAIL__VERTICAL__17=(DOWN__01 && LEVEL__12 && DOWN__23 && DOWN__34) |
| SP__DETAIL__VERTICAL__18=(UP__01 && UP__12 && LEVEL__23 && UP__34) |
| SP__DETAIL__VERTICAL__19=(UP__01 && DOWN__12 && UP__23 && UP__34) |
| SP__DETAIL__VERTICAL__20=(DOWN__01 && DOWN) 2 && UP__23 && DOWN__34) |
| SP__DETAIL__VERTICAL__21=(DOWN__01 && UP__12 && LEVEL__23 && LEVEL__34) |
| SP__DETAIL__VERTICAL__22=(LEVEL__01 && LEVEL__12 && DOWN__23 && UP__34) |
| SP__DETAIL__VERTICAL__23=(UP__01 && UP__12 && UP__23 && LEVEL__34) |
| SP__DETAIL__VERTICAL__24=(LEVEL__01 && DOWN__12 && DOWN__23 && DOWN__34) |
| SP__DETAIL__VERTICAL__25=(UP__01 && UP__12 && LEVEL__23 && LEVEL__34) |
| SP__DETAIL__VERTICAL__26=(LEVEL__01 && LEVEL__12 && DOWN__23 && DOWN__34) |
| SP__DETAIL__VERTICAL__27=(UP__01 && LEVEL__12 && LEVEL__23 && LEVEL__34) |
| SP__DETAIL__VERTICAL__28=(LEVEL__01 && LEVEL__12 && LEVEL__23 && DOWN__34) |
| SP__DETAIL__VERTICAL__29=(UP__01 && LEVEL__12 && LEVEL__23 && DOWN__34) |
| SP__DETAIL__VERTICAL__30=(DOWN__01 && LEVEL__12 && LEVEL__23 && UP__34) |
| SP__DETAIL__VERTICAL__31=(LEVEL__01 && UP__12 && LEVEL__23 && UP__34) |
| SP__DETAIL__VERTICAL__32=(DOWN__01 && LEVEL__12 && DOWN__23 && LEVEL__34) |
| SP__DETAIL__VERTICAL__33=(LEVEL__01 && UP__12 && DOWN__23 && LEVEL__34) |
| SP__DETAIL__VERTICAL__34=(LEVEL__01 && DOWN__12 && UP__23 && LEVEL__34) |

The final stage of the noise reduction algorithm is the selection of a spatial filter. If it determined that all four super soft conditions are TRUE a super soft spatial filter is selected for interpolating the target pixel. If all four soft conditions are TRUE and any of the cases listed in Table 4 is TRUE, a super soft spatial filter is selected for filtering the target pixel. If all four soft conditions are TRUE and none of the cases listed in Table 4 is TRUE, a soft spatial filter is selected for filtering the target pixel. The reason is simple, if a soft or a super soft filter is not selected as a result of the above conditions, then there is spatial detail in the image scene that we want to preserve or even enhance. Therefore, if none of the previous conditions are TRUE, a nominal spatial filter is selected. This logic is illustrated in Table 5 below.

TABLE 5

```
if (SP__SSOFT ) return SSOFT__SPATIAL__FILTER;
if (SP__SOFT)
    if (ANY OF THE CASES IN TABLE 4)
        return SSOFT__SPATIAL__FILTER;
    else
        return SOFT__SPATIAL__FILTER;
return NOMINAL__SPATIAL__FILTER
```

Noise reduction is used in both vertical and horizontal interpolation of the image. The algorithms for each direction are similar but have the following exceptions. Vertical interpolation in the present embodiment applies a seven-tap filter whose filter taps are determined using a 7×3 pixel window. The current algorithm includes a programmable number of cases implemented in the form of a look up table stored in random access memory (RAM). More cases can be added as required.

Horizontal interpolation in the present embodiment applies a six-tap filter whose filter taps are determined using a 1×6 pixel window. This gives us 243 possible combinations [3^5=243]. The current algorithm contains 42 cases with the same hardware support up to 64 cases. Again, more cases can be added as required.

The application of the noise reduction algorithm for horizontal interpolation is very similar to the vertical interpolation algorithm. The main difference is the set of patterns, which includes an additional pixel, and is defined in Table 6 below. The additional pixel in the vertical direction is included to handle noise reduction when using a vertical-temporal filter. Vertical-temporal filtering is applied during deinterlacing to render an interlaced image into a progressive image format. The rules for texture determination are similar, except the spatial relationship between the current field and the previous field must be taken into account. More detailed description of noise reduction in the context of MAVT deinterlacing is found in the accompanying patent entitle "A Method and Apparatus for Motion Adaptive Deinterlacing."

TABLE 6

```
SP__DETAIL__HORIZONTAL__1=(UP__01 && DOWN__12 && UP__23 &&
DOWN__34 && UP__45)
SP__DETAIL__HORIZONTAL__2=(DOWN__01 && UP__12 && DOWN__23 &&
UP__34 && DOWN__45)
SP__DETAIL__HORIZONTAL__3=(UP__01 && UP__12 && UP__23 && DOWN__34
&& DOWN__45)
SP__DETAIL__HORIZONTAL__4=(DOWN__01 && DOWN__12 && DOWN__23 &&
UP__34 && UP__45)
SP__DETAIL__HORIZONTAL__5=(UP__01 && UP__12 && UP__23 && UP__34 &&
UP__45)
SP__DETAIL__HORIZONTAL__6=(DOWN__01 && DOWN__12 && DOWN__23 &&
DOWN__34 && DOWN__45)
SP__DETAIL__HORIZONTAL__7=(DOWN__01 && UP__12 && UP__23 && Up__34
&& DOWN__45)
SE__DETAIL__HORIZONTAL__8=(UP__01 && DOWN__12 && DOWN__23 &&
DOWN__34 && UP__45)
SP__DETAIL__HORIZONTAL__9=(UP__01 && UP__12 && DOWN__23 &&
DOWN__34 && DOWN__45)
SP__DETAIL__HORIZONTAL__10=(DOWN__01 && DOWN__12 && UP__23 &&
UP__34 && UP__45)
SP__DETAIL__HORIZONTAL__11=(UP__01 && UP__12 && UP__23 && DOWN__34
&& DOWN__45)
SP__DETAIL__HORIZONTAL__12=(DOWN__01 && DOWN__12 && DOWN__23
&& UP__34 && UP__45)
SP__DETAIL__HORIZONTAL__13=(DOWN__01 && DOWN__12 && LEVEL__23
&& DOWN__34 && DOWN__45)
SP__DETAIL__HORIZONTAL__14=(UP__01 && UP__12 && LEVEL__23 &&
DOWN__34 && DOWN__45)
SP__DETAIL__HORIZONTAL__15=(DOWN__01 && UP__12 && DOWN__23 &&
LEVEL__34 && UP__45)
SP__DETAIL__HORIZONTAL__16=(DOWN__01 && LEVEL__12 && UP__23 &&
DOWN__34 && UP__45)
SP__DETAIL__HORIZONTAL__17=(DOWN__01 && LEVEL__12 && DOWN__23
&& DOWN__34 && DOWN__45)
SP__DETAIL__HORIZONTAL__18=(UP__01 && UP__12 && UP__23 && LEVEL__34
&& UP__45)
SP__DETAIL__HORIZONTAL__19=(UP__01 && UP__12 && DOWN__23 && UP__34
&& UP__45)
SP__DETAIL__HORIZONTAL__20=(DOWN__01 && DOWN__12 && UP__23 &&
DOWN__34 && DOWN__45)
SP__DETAIL__HORIZONTAL__21=(LEVEL__01 && DOWN__12 && UP__23 &&
LEVEL__34 && LEVEL__45)
SP__DETAIL__HORIZONTAL__22=(LEVEL__01 && LEVEL__12 && DOWN__23
&& UP__34 && LEVEL__45)
```

TABLE 6-continued

SP_DETAIL_HORIZONTAL_23=(UP_01 && UP_12 && UP_23 && LEVEL_34 && LEVEL_45)
SP_DETAIL_HORIZONTAL_24=(LEVEL_01 && LEVEL_12 && DOWN_23 && DOWN_34 && DOWN_45)
SP_DETAIL_HORIZONTAL_25=(UP_01 && UP_12 && UP_23 && UP_34 && LEVEL_45)
SP_DETAIL_HORIZONTAL_26=(LEVEL_01 && DOWN_12 && DOWN_23 && DOWN_34 && DOWN_45)
SP_DETAIL_HORIZONTAL_27=(UP_01 && UP_12 && LEVEL_23 && LEVEL_34 && LEVEL_45)
SP_DETAIL_HORIZONTAL_28=(LEVEL_01 && LEVEL_12 && LEVEL_23 && DOWN_34 && DOWN_45)
SP_DETAIL_HORIZONTAL_29=UP_01 && LEVEL_12 && LEVEL_23 && LEVEL_34 && DOWN_45)
SP_DETAIL_HORIZONTAL_30=(DOWN_01 && LEVEL_12 && LEVEL_23 && LEVEL_34 && UP_45)
SP_DETAIL_HORIZONTAL_31=(LEVEL_01 && UP_12 && LEVEL_23 && UP_34 && LEVEL_45)
SP_DETAIL_HORIZONTAL_32=(LEVEL_01 && DOWN_12 && LEVEL_23 && DOWN_34 && LEVEL_45)
SP_DETAIL_HORIZONTAL_33=(UP_01 && DOWN_12 && DOWN_23 && UP_34 && DOWN_45)
SP_DETAIL_HORIZONTAL_34=(UP_01 && DOWN_12 && Up_23 && UP_34 && DOWN_45)
SP_DETAIL_HORIZONTAL_35=(DOWN_01 && UP_12 && DOWN_23 && UP_34 && LEVEL_45)
SP_DETAIL_HORIZONTAL_36=(LEVEL_01 && DOWN_12 && UP_23 && DOWN_34 && UP_45)
SP_DETAIL_HORIZONTAL_37=(UP_01 && UP_12 && DOWN_23 && DOWN_34 && DOWN_45)
SP_DETAIL_HORIZONTAL_38=(UP_01 && Up_12 && UP_23 && DOWN_34 && DOWN_45)
SP_DETAIL_HORIZONTAL_39=(LEVEL_01 && LEVEL_12 && LEVEL_23 && UP_34 && DOWN_45)
SP_DETAIL_HORIZONTAL_40=(UP_01 && DOWN_12 && LEVEL_23 && LEVEL_34 && LEVEL_45)
SP_DETAIL_HORIZONTAL_41=(LEVEL_01 && LEVEL_12 && DOWN_23 && LEVEL_34 && DOWN_45)
SP_DETAIL_HORIZONTAL_42=(UP_01 && LEVEL_12 && UP_23 && LEVEL_34 && LEVEL_45)

In a practical application of a noise reduction algorithm, three channels are examined for image content. In the case of a YUV colour space, the three channels are Y, U and V. In the RGB colour space, the three channels are R, G and B. A person skilled in the art will appreciate other colour spaces can also be used. Typically, the principles of contouring and noise determination are the same in each channel, but it is possible to allow for variation in different channels. This variability is allowed because there can be different levels of perceptual importance placed on different channels. For instance, it is well known that the eye is more sensitive to luma, the Y component, in the YUV colour space as compared to either the U or V component with respect to frequency content. Thus, it may often be sufficient to implement the noise reduction algorithm on only the Y channel.

Figure 8:
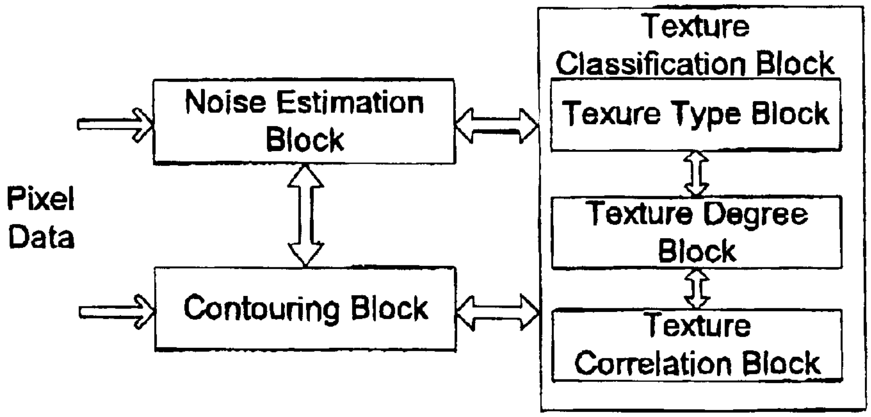
FIG. 8 is block diagram of a noise detection and processing unit.

Referring to FIG. 8, a system for implementing the algorithm described above is illustrated. The system comprises a noise estimation block, a contouring block and a texture classification block (TCB). The TCB further comprises a texture type block (TTB), texture degree block (TDB) and a texture correlation block. Pixel data is provided to all of the blocks, and the blocks are all capable of communicating with each other.

The noise estimation block is responsible for maintaining the histogram and estimating the noise in the image for selecting an appropriate set of filters. The contouring block selects collection of connected pixels in a neighbourhood of pixels in the image that constitute a level set, or the nearest equivalent as determined by comparators and thresholds. A level set is a collection of neighbouring pixel values that are most alike in terms of amplitude. Two pixels are considered connected if there is no intervening pixel of different magnitude (as measured relative to a programmable threshold) between them. The contouring block is reconfigurable and classifies local image structure into a number of predefined contour patterns as shown in FIG. 6. Once a contour has been chosen, a texture classification stage ensues.

The texture type block (TTB) is used for detecting predetermined patterns in an image that may constitute noise. For example, the TTM looks for the patterns defined in Table 4. The texture degree block (TDB) determines the severity of the texture in the contour. That is, the TDB examines the difference in magnitude between pixels on the selected contour. The selection of an appropriate filter is determined in accordance with both the TTB and TDB. For example, for one type of pattern a single noise threshold is in effect and is set to 10. Therefore, if the pattern is detected and the deviation between the maximum and minimum pixel value of the pixels belonging to the contour in question is within 10, then the contour is deemed noisy. As a result, a relatively soft filter is applied during filtering or interpolation. Otherwise, a soft filter is not applied.

For an alternate type of pattern, once the pattern is detected case the TCB reacts the same way regardless of the deviation between maximum and minimum pixel values. For example, for a pattern that constantly has an increasing value, the pattern is never considered noise because an assumption is that noise is not spatially correlated. Thus, regardless of the difference in pixel magnitudes, the pattern is treated the same way. The FCB and FDB work in tandem to make the classification of patterns into known types of categories more apparent and more flexible.

Furthermore, numerous specific embodiments are described herein for illustrative purpose only. A person skilled in the art will appreciate than numerous modifications or additions can be implemented. The aspects include the size of the pixel windows examined, the number of noise classification templates uses, the details of the histogram, number of filters and the like. Thus, although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method for selecting a filter for interpolating a target pixel for reducing noise in an image, said method comprising the steps of:

a) comparing a plurality of pixels along a predetermined contour with a plurality of predefined patterns, said patterns representing visually significant patterns possible along said contour; and b) selecting a filter from a predefined set of filters in accordance with said results of said comparison.

2. A method as defined in claims 1, wherein said method further includes the step of comparing a difference between ones of said plurality of pixels with at least one predefined thresholds, said filter being selected in accordance with said threshold comparison as well as said pattern comparison.

3. A method as defined in claim 1, wherein said method further includes the step of estimating an amount out noise in said image, whereby said set of filters is selection from a plurality of filters in accordance with said estimated amount of noise.

4. A method as defined in claim 3, wherein said method for estimating said amount of noise in said image includes the steps of:

a) comparing a plurality of pixels on a pixel window with at least one noise template;

b) recording each match of said pixel window with said noise template in accordance with a magnitude difference of predefined ones of said plurality of pixels in said pixel window; and c) determining a number of occurrences of said matches;

wherein said amount of noise in said image is associate with a frequency of said number of occurrence of said matches.

* * * * *

UNITED STATES PATENT AND TRADEMARK OFFICE

CERTIFICATE OF CORRECTION

PATENT NO. : 6,933,983 B2
APPLICATION NO. : 10/155013
DATED : August 23, 2005
INVENTOR(S) : Wredenhagen et al.

It is certified that error appears in the above-identified patent and that said Letters Patent is hereby corrected as shown below:

At column 1, line 17, please replace " "Buttey" and" with --"Butterfly" and--
At column 1, line 18, please replace "Picrare" with --Picture--
At column 1, line 29, please replace "usually displeasing" with --visually displeasing--
At column 1, line 37, please replace "filters rend to worsen" with --filters tend to worsen--
At column 1, line 52, please replace "do nor deal" with --do not deal--
At column 1, line 55, please replace "and H. Chew" with --and H. Chen--
At column 3, line 11, please replace "notion adaptive" with --motion adaptive--
At column 3, line 17, please replace "MAVTF((" with --MAVTF(--
At column 3, line 19, please replace "MAVTF((" with --MAVTF(--
At column 3, line 22, please replace "PFF((" with --PFF(--
At column 4, line 33, please replace "additives" with --additive,--
At column 5, line 10, please replace "TLLH=10" with --TTLH=10--
At column 6, line 64, please replace "function scalar" with --A function scalar--
At column 6, line 66, please replace "RC" with --HC--
At column 6, line 67, please replace "number r. A" with --number r.--
At column 8, line 12, please replace "trend lines," with --trend lines.--
At column 9, line 12, TABLE 2, please replace "CONT)" with --COND--
At column 10, line 18, please replace "noise," with --noise.--
At column 10, TABLE 4 (26 lines down), please replace "DOWN) 2" with --DOWN_12--
At column 12, TABLE 6 (16 lines down), please replace "SE_" with --SP_--

Signed and Sealed this

Twenty-sixth Day of December, 2006

JON W. DUDAS
*Director of the United States Patent and Trademark Office*